United States Patent
Leigh et al.

(10) Patent No.: US 10,838,153 B2
(45) Date of Patent: Nov. 17, 2020

(54) INDEPENDENTLY-FLOATED COMPACT DUPLEX FERRULE

(71) Applicant: Hewlett Packard Enterprise Development LP, Houston, TX (US)

(72) Inventors: Kevin B. Leigh, Houston, TX (US); John Norton, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/361,975

(22) Filed: Mar. 22, 2019

(65) Prior Publication Data

US 2020/0301079 A1  Sep. 24, 2020

(51) Int. Cl.
*G02B 6/38* (2006.01)

(52) U.S. Cl.
CPC ........... *G02B 6/3831* (2013.01); *G02B 6/387* (2013.01); *G02B 6/3825* (2013.01); *G02B 6/3839* (2013.01); *G02B 6/3851* (2013.01); *G02B 6/3857* (2013.01); *G02B 6/3897* (2013.01)

(58) Field of Classification Search
CPC .................................................... G02B 6/3831
See application file for complete search history.

(56) References Cited

U.S. PATENT DOCUMENTS

| | | | | |
|---|---|---|---|---|
| 4,174,882 A | * | 11/1979 | McCartney | G02B 6/383 385/71 |
| 5,222,169 A | * | 6/1993 | Chang | G02B 6/3869 385/87 |
| 5,600,748 A | | 2/1997 | Kosaka | |
| 5,633,970 A | * | 5/1997 | Olson | G02B 6/3812 385/147 |
| 5,692,080 A | * | 11/1997 | Lu | G02B 6/3831 385/55 |
| 6,394,662 B1 | * | 5/2002 | Foster | G02B 6/3849 385/60 |
| 7,373,037 B2 | | 5/2008 | Wu | |
| 8,406,597 B2 | | 3/2013 | Case | |
| 8,768,116 B2 | | 7/2014 | Mccolloch et al. | |
| 9,897,767 B2 | | 2/2018 | Murray et al. | |
| 9,927,582 B2 | | 3/2018 | Chang et al. | |
| 1,006,730 A1 | | 9/2018 | Murray et al. | |
| 1,010,797 A1 | | 10/2018 | Sano et al. | |
| 1,015,668 A1 | | 12/2018 | Manes et al. | |
| 1,019,123 A1 | | 1/2019 | Wong et al. | |
| 2011/0222819 A1 | | 9/2011 | Anderson et al. | |

(Continued)

OTHER PUBLICATIONS

DiBella, W. L.; "Data Center World Global 2018 San Antonio"; Mar. 12-15, 2018; 96 pages.

(Continued)

*Primary Examiner* — Omar R Rojas
(74) *Attorney, Agent, or Firm* — Hewlett Packard Enterprise Patent Department

(57) ABSTRACT

An independently-floated duplex ferrule connector is provided. A duplex ferrule component includes a duplex ferrule flange, having two ferrule sockets disposed on one end. A spring component comprising two ferrule couplers configured to mate with a retention feature of a ferrule. Each ferrule is independently-floated within one of the two ferrule sockets of the duplex ferrule flange such that each ferrule can move in a z-direction independently of the other ferrule.

13 Claims, 11 Drawing Sheets

(56) References Cited

U.S. PATENT DOCUMENTS

2019/0018209 A1    1/2019  Takano et al.
2019/0154923 A1*   5/2019  Flaig .................... G02B 6/3897

OTHER PUBLICATIONS

TTIFiber.com; "Singlemode MPO Fiber Optic Cassette with LC Duplex Optical Fiber Adapter"; printed from webpage: http://www.ttifiber.com/sale-8491346-singlemode-mpo-fiber-optic-cassette-with-ic-duplex-optical-fiber-adapter.html on Feb. 19, 2019; 3 pages.

* cited by examiner

INDEPENDENTLY-FLOATED COMPACT DUPLEX FERRULE

BACKGROUND

Fiber optic cables facilitate transmission of data over optical cables rather than electrical cables. Compared to electrical cables, fiber optic cables are less susceptible to electromagnetic interference, enabling transmission of data over further distances. Fiber optic cables generally terminate in a connector assembly, where the optical fibers within the cable are split and coupled to a ferrule. The ferrule serves to protect and assist in aligning the ends of the optical fibers so the optical signals traveling within those optical fibers egresses properly. A common connector used in data centers is called a duplex ferrule connector, where two simplex ferrule constructs, including the ferrule of an optical fiber and a housing, are held together by a strap or external housing, providing both a transmit optical fiber and a receive optical fiber within a single connector.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Some of the figures included herein illustrate various embodiments of the invention from different viewing angles. Although the accompanying descriptive text may refer to elements depicted therein as being on the "top," "bottom" or "side" of an apparatus, such references are merely descriptive and do not imply or require that the invention be implemented or used in a particular spatial orientation unless explicitly stated otherwise.

The figures are not exhaustive and do not limit the present disclosure to the precise form disclosed.

DETAILED DESCRIPTION

Current duplex connector assemblies generally comprise two simplex ferrule assemblies that are strapped together utilizing a plastic bracket or housing. One such commonly used duplex connector assembly is the LC Duplex connector. The LC Duplex connector utilizes traditional standard connector components, having independent ceramic ferrules and housings. Although smaller than a standard optical connector, duplex connector assemblies (like the LC Duplex connector) incur a relatively large cost and resource overhead because two separate simplex ferrule assemblies with two sets of corresponding metal flanges and coil springs are built and then strapped together. Moreover, because two separate simplex ferrules are used, the resulting connector is still rather large considering the high-density needs of current systems. That is, LC Duplex connectors generally cannot fit within confined spaces often found in high-density solutions, such as behind standard pluggable devices (e.g., small form-factor pluggable (SFP), quad small form-factor pluggable (QSFP), high-density pluggable, and system faceplate.

Embodiments of the present disclosure provide a duplex ferrule connector having independently-floated ferrules within a single flange supported by a single resilient member or spring component (e.g., a leaf spring, sheet metal-style spring). Therefore, embodiments of the technology disclosed herein provides a low-cost, small form-factor duplex ferrule, making high-density architectures less costly and easier to install and maintain. A single flange with two ferrule sockets extending from a distal end is utilized, rather than separate flanges for each ferrule component of the duplex ferrule connector. Each ferrule is independently-floated within a socket, with room for z-direction movement of the ferrule. The single spring component to holds each ferrule steady in relation to each other, and serves as a limit to the amount of z-direction float to avoid the ferrule moving too far into the socket (thereby overly bending the optical fiber) and moving too far out of the socket (i.e., maintaining the ferrule's seat in the socket). By reducing the number of components required for a duplex connector, embodiments of the present disclosure provide a compact and low-cost solution for the increasing number of fiber optical cables used within data centers.

Figure 1:
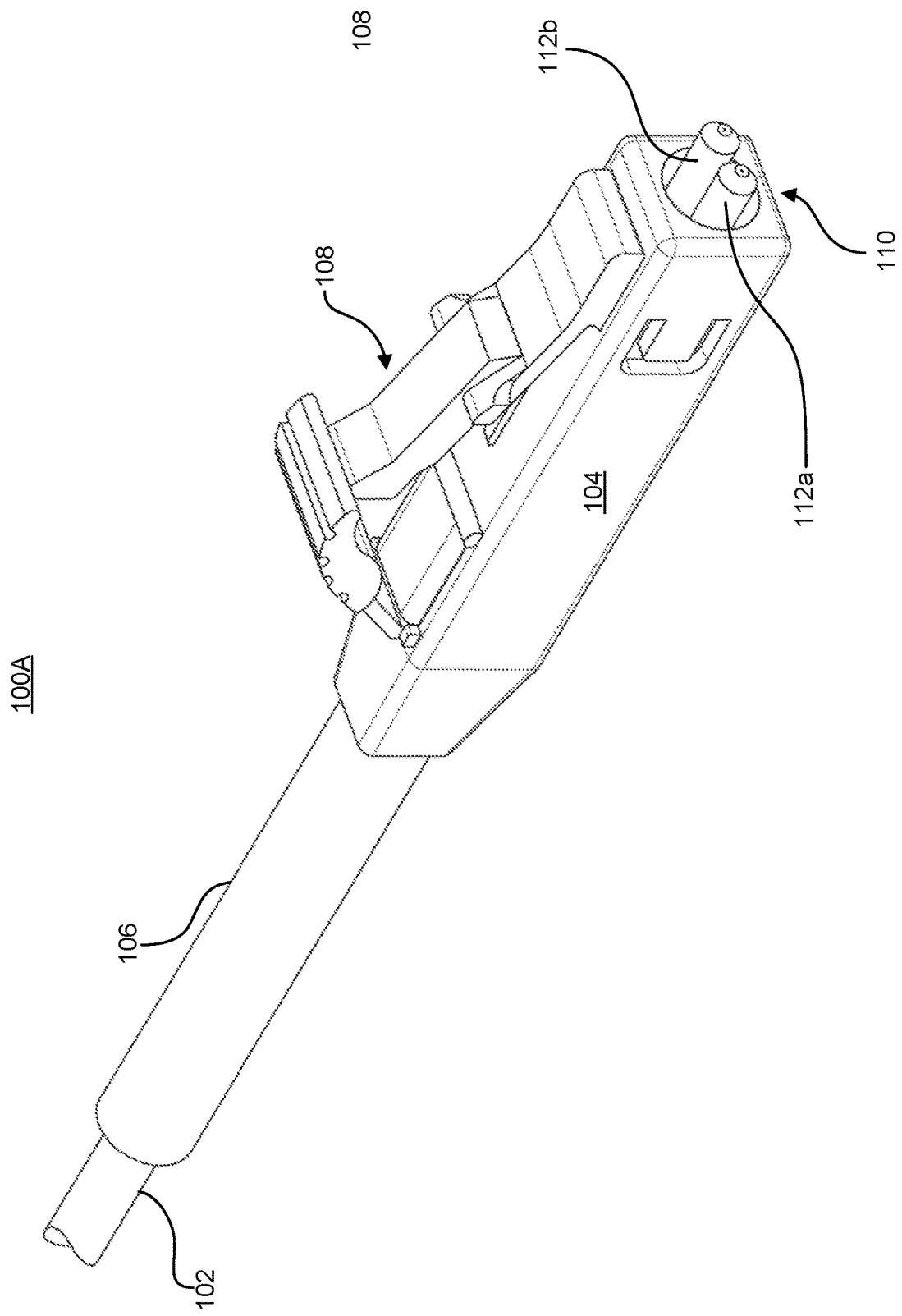
FIG. 1 shows an example perspective view of an example compact duplex connector assembly in accordance with embodiments of the technology disclosed herein

FIG. 1 shows an example perspective view of an example compact duplex connector assembly 100A in accordance with embodiments of the technology disclosed herein. As illustrated, an optical cable 102 is inserted into a housing 104 through a rear opening (not shown in FIG. 1) of housing 104. In various embodiments, optical cable 102 may contain one or more single-mode optical fibers, while in other embodiments optical cable 102 may contain one or more multimode optical fibers. In various embodiments, a boot 106 may cover optical cable 102 to provide control the bend angle of the optical cable 102 and to provide retention of the end of optical cable 102 to the housing 104. In some embodiments, boot 106 may be a separate component placed over optical cable 102 prior to optical cable 102 being coupled to housing 104, in other embodiments boot 106 may be a part of housing 104. Although illustrated as covering optical cable 102, in some embodiments boot 106 may cover both a portion of optical cable 102 and a portion of housing 104.

In various embodiments, housing 104 includes a latching mechanism 108. As illustrated, latching mechanism 108 comprises a front pivot latch. In other embodiments, latching mechanism 108 may comprise another latch-type mechanism used for securing cable connectors within the art. Latching mechanism 108 may comprise a pull tab-style mechanism in other embodiments. Housing 104 also includes a front opening 110 configured to allow two ferrules 112a, 112b to extend out from within an interior cavity (not shown) of housing 104. Front opening 110 is shown as having a circular shape, but in other embodiments the shape of front opening 110 may be any shape dimensioned such that ferrules 112a, 112b have clearance to extend out from the housing 104 without interfering with the other ferrule and/or an edge of the front opening 110. A person of ordinary skill in the art, in view of the following disclosure and associated figures, would understand that this is due to the perspective view shown in FIG. 1. In various embodiments, front opening 110 may be shaped to allow housing 104 to be installed in a connector adapter (like dual-polarity-keyed adapter 600 discussed with respect to FIGS. 6-9 below).

Figure 2A:
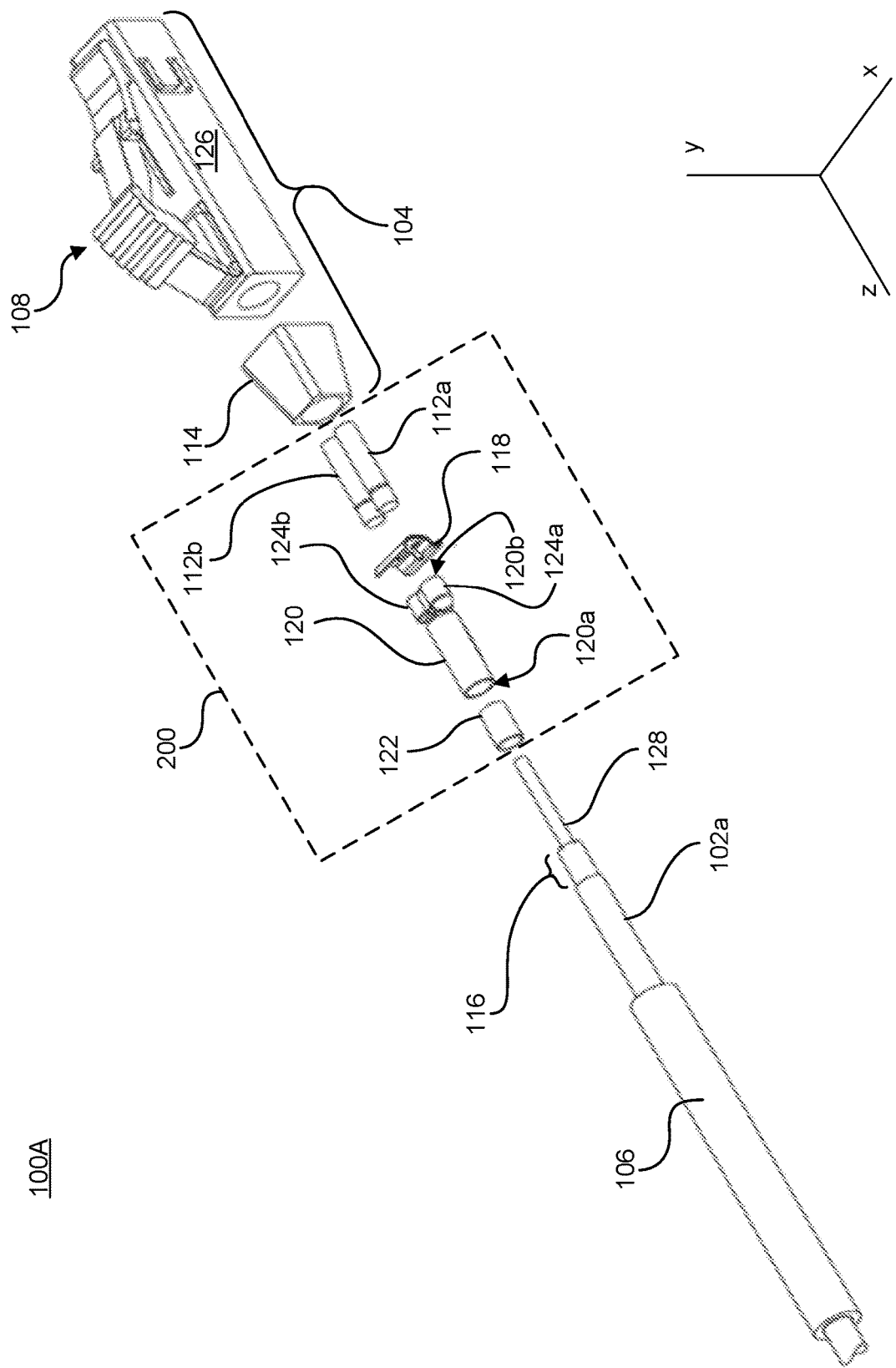
FIG. 2A is an exploded view of the example compact duplex connector assembly of FIG. 1 in accordance with embodiments of the technology disclosed herein.

FIG. 2A is an exploded view of the example compact duplex connector assembly 100A of FIG. 1, showing internal components of compact duplex connector assembly 100A. It should be understood that the description of an element, component, or other aspect of various embodiments labeled by a particular reference numeral applies to all uses of that element, component, or aspect when referred to by the same reference numeral in other figures and throughout this disclosure unless clearly stated otherwise. Referring to FIG. 2A, the example compact duplex connector assembly 100A may include an optical cable 102 (with a first portion 102a or distal end portion), a ferrule connector component 200 (with a crimp collar 122, a duplex ferrule flange 120, a spring component 118, and two ferrules 112a, 112b), and a housing 104 comprising a rear portion 114, a main portion 126, and a latching mechanism 108. In various embodiments, e.g., during assembly or installation, the first portion 102a of optical cable 102 may be inserted through an opening in rear portion 114 of housing 104. First portion 102a may include a crimp portion 116. In some embodiments, crimp portion 116 may comprise a length of first portion 102a where the cable jacket (i.e., the insulation material around the optical fibers in the core of optical cable 102) is stripped away, exposing the cladded fibers (not shown) of optical cable 102. In various embodiments, crimp portion 116 may comprise a length of optical cable 102 where the cable jacket may be thinner than the rest of optical cable 102. In other embodiments, crimp portion 116 may be the same thickness as the rest of the cable jacket of optical cable 102 and represents a length of first portion 102a to which the ferrule connector component 200 is connected. In constructing compact duplex ferrule connector 100A, cladded fibers 128 (shown in FIG. 4A) may be exposed. Cladded fibers 128 comprise one or more fiber cores within optical cable 102. Each cladded fiber 128 may be communicatively coupled to one of ferrules 112a, 112b. Although illustrated as a single cable, such illustration is provided for explanation only and should not be interpreted as limiting cladded fibers 128 to a single cladded fiber. In various embodiments, a plurality of cladded fibers 128 may be included within optical cable 102.

As described above, the ferrule connector component 200 may comprise a crimp collar 122, a duplex ferrule flange 120, a spring component 118, and ferrules 112a, 112b in various embodiments. Crimp collar 122 may be attached to crimp portion 116, and the first end 120a of the flange 120 may be crimped (e.g., to or around crimp collar 122), to strengthen compact duplex connector assembly 100A against excessive pulling force on optical cable 102 during installation and use. As a non-limiting example, the inner surface of crimp collar 122 may be textured or patterned. In another example, the outer surface of crimp collar 122 may be textured or patterned. In yet another example, both the inner and the outer surfaces of crimp collar 122 may be textured or patterned, to provide frictional force in order to securely hold the optical cable 102 to the flange 120 when the 120a opening end portion of the flange 120 is crimped or otherwise coupled to the crimp collar 122. In various embodiments, crimp collar 122 may be made of various materials, including but not limited to plastic, carbon fiber, copper, aluminum, titanium, and steel, among other metals and metal alloys. In other embodiments, crimp collar 122 may be made of any ductile material.

Duplex ferrule flange 120 comprises a first end 120a and a second end 120b. First end 120a has an opening, configured to receive crimp portion 116 of optical cable 102. Second end 120b has two sockets 124a and 124b where each socket 124a, 124b has an opening. Unlike current duplex connectors, duplex ferrule flange 120 is configured to support ferrules 112a, 112b, rather than requiring a separate flange for each ferrule 112a, 112b. By reducing the number of flanges required, embodiments of the present disclosure reduce the size of the form-factor of the connector. As shown in FIG. 2A, crimp collar 122 (and crimp portion 116) are inserted into an opening at first end 120a of duplex ferrule flange 120. Duplex ferrule flange 120 is configured to attach the cladded fibers 128 of optical cable 102 to each of the ferrules 112a, 112b. The two ferrule sockets 124a, 124b are disposed on the second end 120b of duplex ferrule flange 120. Each ferrule socket 124a, 124b is configured to accept one of ferrules 112a, 112b. Spring component 118 is coupled to each ferrule 112a, 112b. Spring component 118 enables ferrule 112a, 112b to be independently movable in the z-axis. Spring component 118 may maintain the orientation of ferrules 112a, 112b. In various embodiments, spring component 118 serves to bias the ferrules 112a, 112b towards front opening 110. In various embodiments, spring component 118 comprises two ferrule slots, one for each of ferrules 112a, 112b. In some embodiments, the inner surface of ferrule sockets 124a, 124b may be textured or patterned to provide additional frictional force to stabilize ferrules 112a, 112b within each ferrule socket 124a, 124b and reduce unintended movement of ferrules 124a, 124b in the z-direction. In various embodiments, spring component 118 and/or ferrule sockets 124a, 124b may be configured to maintain an angular orientation of ferrules 112a, 112b.

Figure 2B:
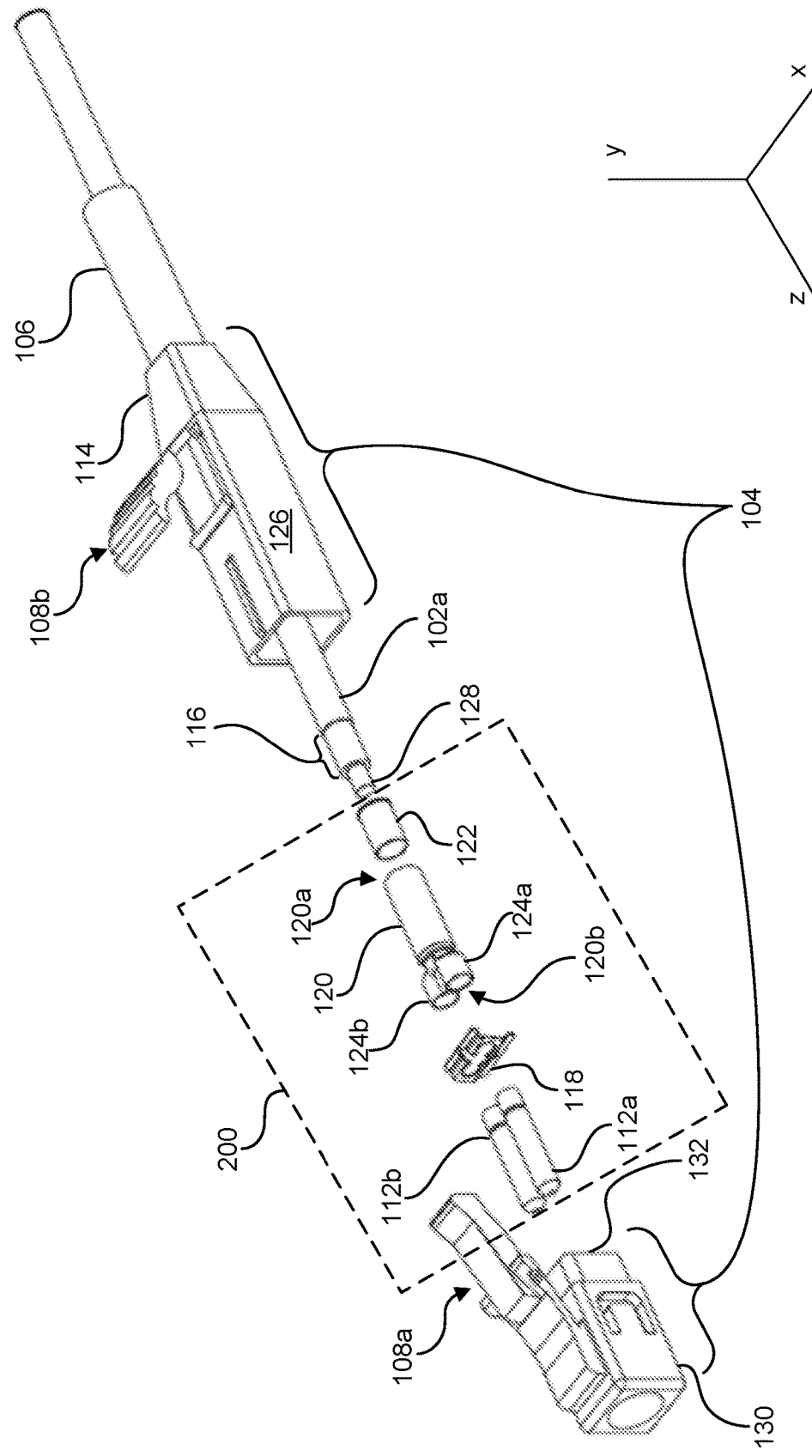
FIG. 2B is an exploded view of another example compact duplex connector assembly in accordance with embodiments of the technology disclosed herein.

FIG. 2B illustrates another example compact duplex ferrule connector 100B in accordance with embodiments of the present disclosure. Where like references are used between figures, any discussion with respect to those references should be interpreted as applicable to all like references in other figures. As illustrated in FIG. 2B, compact duplex ferrule connector 100B provides another example housing 104 for use in various embodiments. Housing 104 is a multi-piece housing including rear portion 114, main portion 126, and front portion 130. In some embodiments, latching mechanism 108 may be split into two pieces, a front latching portion 108a and a rear latching portion 108b, while in other embodiments both latching portions 108a, 108b may be disposed on the same part of housing 104. In various embodiments, rear portion 114 and main portion 126 may be combined in a single component. Front portion 130 may be configured to mate with main portion 126. In various embodiments, front portion 130 may include a mating feature 132, configured to fit within an opening of main portion 126. In some embodiments, mating feature 132 may be disposed on a front of main portion 126 and configured to fit within front portion 130.

As shown in FIG. 2B, first portion 102a of optical cable 102 is inserted into the cavity of housing 104 through rear portion 114. In various embodiments, first portion 102a may be inserted prior to coupling an example ferrule connector component 200 to optical cable 102. After installing or assembling the ferrule connector component 200, front portion 130 may be coupled to main portion 126 to seal the cavity of housing 104 to form compact duplex ferrule connector 100B.

Figure 3A:
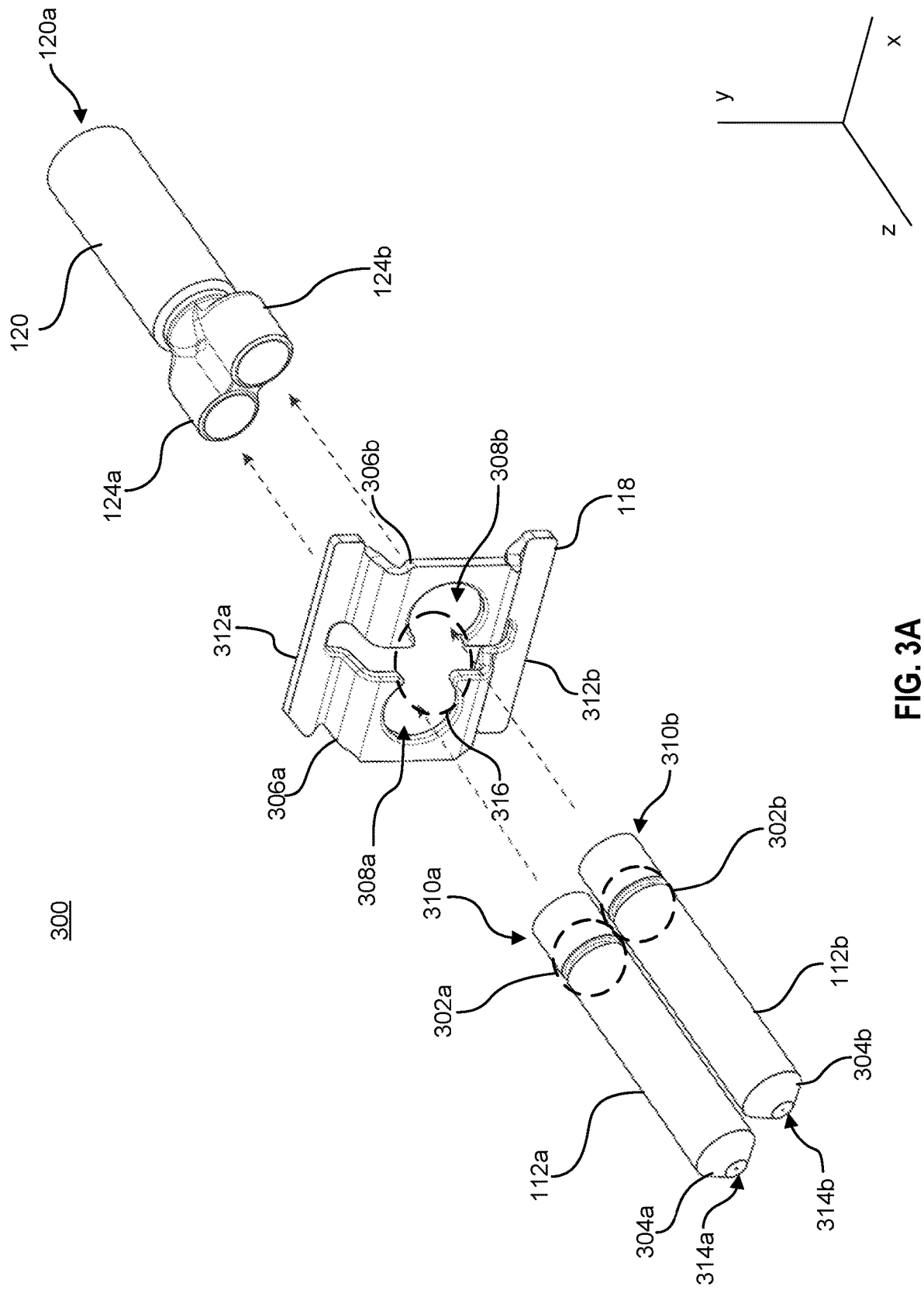
FIG. 3A is an exploded view of an example ferrule connector component in accordance with embodiments of the technology disclosed herein

FIG. 3A is an exploded view of an example ferrule connector component 300 in accordance with embodiments of the present disclosure. Ferrule connector component 300 may be similar to the ferrule connector component 200 discussed with respect to FIGS. 2A and 2B. Referring to FIG. 3A, crimp collar 122, optical cable 102 and cladded fibers 128 discussed with respect to FIG. 2A, are not illustrated for clarity with respect to this Figure.

Ferrule connector component 300 comprises ferrules 112a, 112b. As discussed above, ferrules 112a, 112b protect cladded fibers 128 of optical cable 102 and assist in aligning cladded fibers 128 with corresponding cladded fibers 128 of a mating optical cable (shown in later figures). In various embodiments, each ferrule 112a, 112b may be configured with a retention feature configured to mate or otherwise interact with spring component 118. In the illustrated embodiment, the retention feature is shown as respective grooves 302a, 302b disposed on the surface of each ferrule 112a, 112b, creating a front section and a rear section of each ferrule 112a, 112b. The front sections extending from each retention feature 302, 302b to respective tips 304a, 304b, and rear sections extend from respective retention features 302a, 302b to a socket end 310a, 310b. While illustrated as grooves, in other embodiments, the retention features may be lips or protrusions extending around an outer diameter of the ferrules for mating with corresponding features (e.g., grooves or channels) of spring component 118. In yet other embodiments, the retention feature may not be part of or integrated with each ferrule 112a, 112b but a retention component may be connected to each ferrule 112a, 112b, such as the ferrule cup discussed with respect to FIG. 4 below. In some embodiments, ferrule 112a, 112b may be made of ceramic materials, e.g., zirconia. In other embodiments, ferrule 112a, 112b may be made of non-ceramic materials, e.g., borosilicate glass (Pyrex), Kovar, stainless steel, beryllium copper, nickel.

Tips 304a, 304b of each ferrule 112a, 112b include a tip opening 314a, 314b. Tip opening 314a, 314b is configured to allow cladded fibers 128 within optical cable 102 to protrude therethrough. Tip 304a, 304b, with cladded fibers 128a, 128b inserted, may be polished for the fiber cores to have a certain shape. Tip 304a, 304b shape may be flat or angle. In various embodiments, spring component 118 and/ or ferrule sockets 124a, 124b may be configured to maintain an angular orientation of ferrules 112a, 112b. As discussed above, ferrules 112a, 112b in a first compact duplex ferrule assembly (e.g., compact duplex ferrule assembly 100A or 100B) are configured to mate with complementary ferrules 112a, 112b in a second compact duplex ferrule assembly (e.g., compact duplex ferrule assembly 100A or 100B). When connecting ferrules, optical return loss (or "back reflection") impacts the effectiveness of the optical system. Polishing each ferrule tip attempts to avoid this issue. In various embodiments, each tip 304a, 304b may be polished to have a flat interface between connectors, such as (but not limited to) physical contact (PC) that has a slight dome, or ultra physical contact (UPC) created from a more extensive PC polishing. In other embodiments, each ferrule tip 304a, 304b may be polished at an angle, resulting in an angled physical contact (APC). When using APC, each ferrule 112a, 112b would have a complimentary ferrule in another connector, one whose tip 304a, 304b is shaped to match the angle of ferrule 112a, 112b. In such embodiments, spring component 118 may be configured to ensure each ferrule 112a, 112b is in the proper orientation or position to enable tip 304a, 304b to communicatively couple with tip 304a, 304b of a corresponding ferrule 112a, 112b in another connector (e.g., compact duplex connector assembly 100A of FIGS. 1 and 2A or compact duplex connector assembly 100B of FIG. 2B). Socket end 310a, 310b comprises a portion of each ferrule 112, 112b configured to be inserted into a ferrule socket 124a, 124b of duplex ferrule flange 120.

As mentioned above, each groove 302a, 302b is configured to couple to spring component 118. Spring component 118 of ferrule connector component 300 comprises two ferrule couplers 306a, 306b, each having a ferrule slot 308a, 308b. Ferrule slots 308a, 308b are openings within each ferrule coupler 306a, 306b configured to mate with the groove 302a, 302b, being disposed between front sections of each ferrule 112a, 112b and duplex ferrule flange 120 when assembled or coupled together. In the illustrated embodiments, ferrule slots 308a, 308b comprise semi-circular holes formed within each ferrule coupler 306a, 306b that form an opening 316 in an interior of spring component 118. In other embodiments, ferrule slots 308a, 308b may have a non-circular shape that correspond to non-circular shape of the grooves 302a, 302b of the ferrules 112a, 112b. The non-circular shape allows the ferrule tips 304a, 304b to be disposed in a particular or selected rotational angle. Ferrule couplers 306a, 308b may be connected by bars 312a, 312b, creating a single component.

As discussed above, spring component 118 serves to provide force on each ferrule 112a, 112b to bias each towards front opening 110 (see FIG. 1). When implemented, spring component 118 allows each ferrule 112a, 112b to move in the z-direction within each ferrule socket 124a, 124b independently relative to each other, while also limiting the amount of movement of each ferrule 112a, 112b in the z-direction within the ferrule socket 124a, 124b to protect the optical fibers from being bent too far and increasing the risk of damage to cladded fibers 128a, 128b. For purposes of this disclosure, motion in the z-direction means motion along an axis extending from a center point of tips 314a, 314b to a center point of first opening 120a of duplex ferrule flange 120.

Figure 3B:
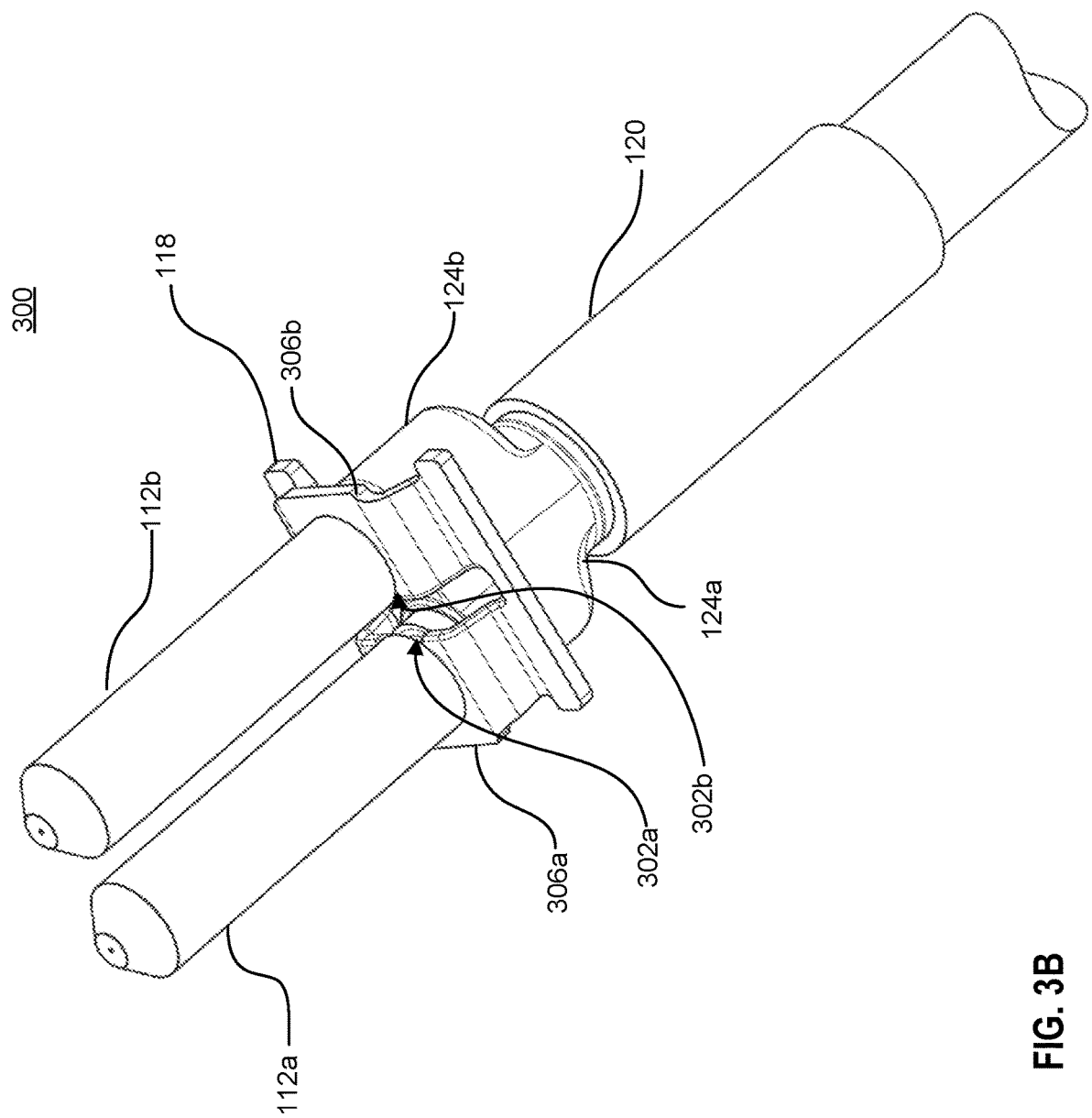
FIG. 3B is a perspective view of ferrule connector component, illustrating the relationship between ferrules, spring component, and duplex ferrule flange in accordance with embodiments of the technology disclosed herein.

FIG. 3B is a perspective view of ferrule connector component 300, illustrating the relationship between ferrules 112a, 112b, spring component 118, and duplex ferrule flange 120. As illustrated, each ferrule coupler 306a, 306b of spring component 118 is situated within a respective groove 302a, 302b, to secure the ferrule 112a, 112b in spring component 118. Socket end 310a, 310b of each ferrule 112a, 112b is inserted into a ferrule socket 124a, 124b of duplex ferrule flange 120. Use of ferrule connector component 300 reduces the number of parts needed to produce a duplex connector assembly by utilizing a single flange and a single spring-like component for both ferrules 112a, 112b, rather than building two separate simplex ferrule assemblies that need to be strapped together to form a duplex connector.

Figure 4A:
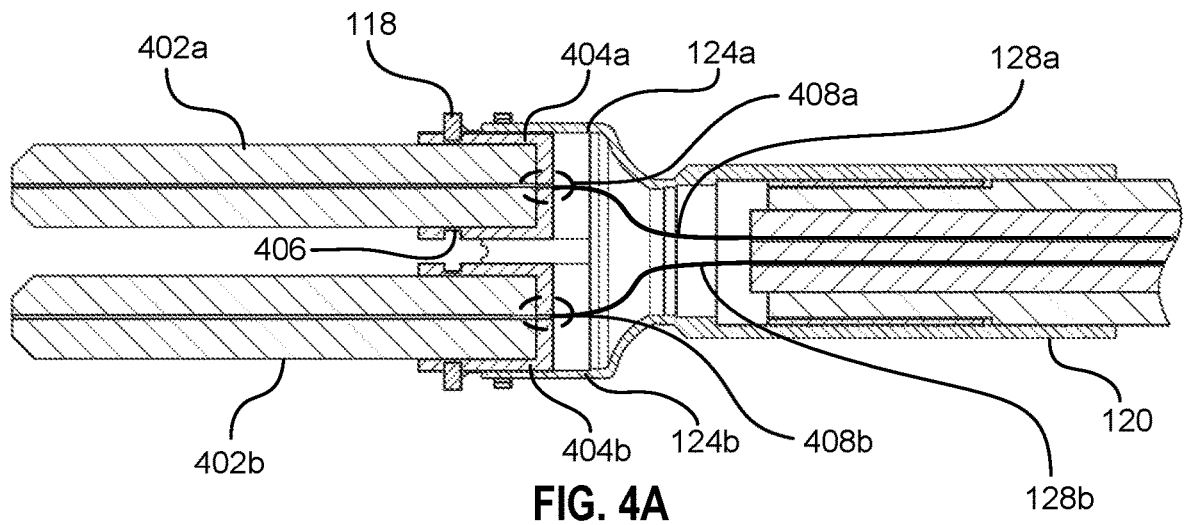
FIG. 4A illustrates another example ferrule connector component in accordance with embodiments of the technology disclosed herein.
Figure 4B:
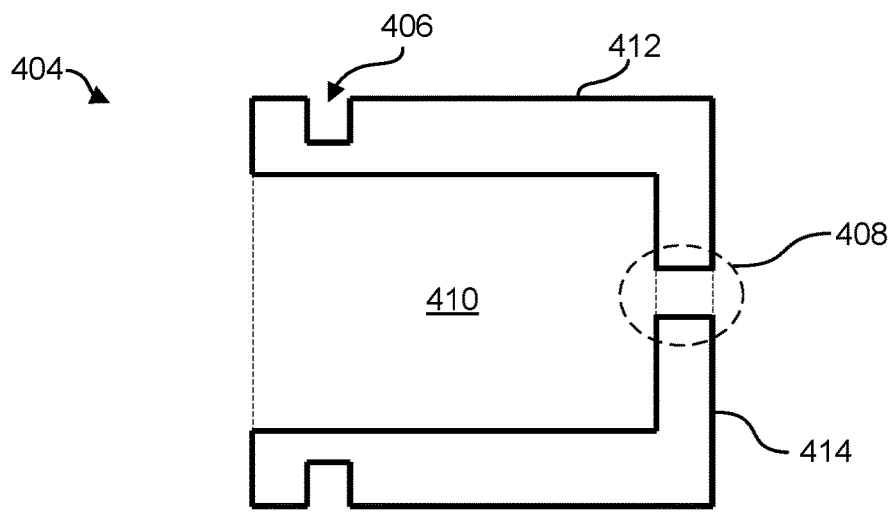
FIG. 4B illustrates an example ferrule cup in accordance with embodiments of the technology disclosed herein.
Figure 4C:
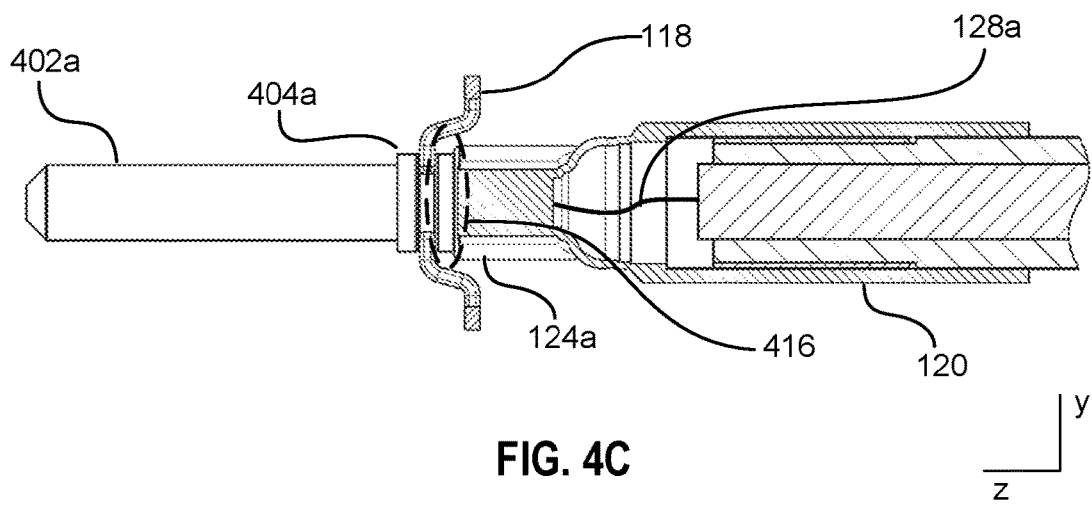
FIG. 4C illustrates another view of example ferrule connector component of FIG. 4A in accordance with embodiments of the technology disclosed herein.

As discussed above, various embodiments of the technology disclosed herein may be used with ferrules lacking a built-in retention feature (e.g., grooves 302a, 302b discussed above with respect to FIG. 3). FIGS. 4A, 4B, and 4C illustrate an example ferrule connector component 400 in accordance with such embodiments. As illustrated in the cross-sectional view of FIG. 4A, ferrules 402a, 402b do not have a retention feature, like the grooves discussed above. Instead, ferrule cups 404a, 404b may be used. Each ferrule 402a, 402b is inserted into a ferrule cup 404a, 404b. Ferrule cup 404a, 404b allows for any common ferrule to be used. Rather than having a groove disposed on each ferrule, a groove 406 (or lip as described above) may be formed on a surface of each ferrule cup 404a, 404b, configured to mate with duplex ferrule flange 118 in a similar manner as the grooves 302a, 302b. In various embodiments, ferrule cups 404a, 404b may be constructed out of plastic, metal, metal alloy, or other suitable material. Ferrule cup 404a, 404b may have different shape to control the angular orientation of the ferrule 402a, 402b for asymmetrically polished ferrule end-faces, e.g., APC (Angled Physical Contact). As a non-limiting example, the end of each ferrule 402a, 402b installed in respective ferrule cup 402a, 402b may have a complementary profile on the outer surface with respect to the inner surface profile of ferrule sockets 124a, 124b to keep the ferrule 402a, 402b in the proper angular orientation.

In various embodiments, groove 406 may be etched into the surface of ferrule cups 404a, 404b, while in other embodiments ferrule cup 404a, 404b may be manufactured to include groove 406 (e.g., injection molding, formed metal, etc.). Each ferrule cup 404a, 404b includes a fiber aperture 408a, 408b, allowing a cladded fiber (not shown) from optical cable 102 to enter each ferrule 402a, 402b. In embodiments utilizing ferrule cups 404a, 404b, each ferrule socket 124a, 124b may be dimensioned such that ferrule cups 404a, 404b may be inserted in a manner similar to that discussed with respect to FIGS. 3A and 3B. In some embodiments, the inner surface of ferrule cups 404a, 404b may be textured or patterned to maintain the installed position of a ferrule 402a, 402b within a ferrule cup 404a, 404b.

FIG. 4B is an example cross-sectional view of a ferrule cup 404 of FIG. 4A without the other components. As shown in FIG. 4B ferrule cup 404 includes a ferrule cavity 410 for receiving a ferrule 402a, 402b. Ferrule cavity 410 is formed by a wall 412 extending upward from a base 414. Groove 406 is disposed on the surface of wall 412. In various embodiments, groove 406 may extend over the circumference of wall 412, while in some embodiments groove 406 may extend over only a portion of the circumference of wall 412. In some embodiments, groove 406 may be dimensioned to mate with two or more prongs of a ferrule coupler, one or more such grooves 406 being disposed on wall 412. Ferrule cavity 410 may have a cylindrical shape or other shapes, complementary to the base of ferrule 402a, 402b. As a non-limiting example, the base of ferrules 402a, 402b may be cylindrical, and ferrule cavity 410 may be shaped to match the radius of ferrules 402a, 402b. Wall 412 would have the same shape as ferrule cavity 410. In various embodiments, base 414 may include a fiber aperture 408 for the reasons discussed above. In some embodiments, fiber aperture 408 may have a circumference larger than the circumference of a cladded fiber, such as cladded fibers 128 of optical cable 102.

FIG. 4C illustrates another cross-sectional view of ferrule connector component 400 of FIG. 4A. The view of FIG. 4C is of a side view of ferrule connector component 400, crossing the component 400 between ferrules, showing ferrule 402a. As illustrated, ferrule 402a is inserted into ferrule cup 404a, which is therein inserted into ferrule socket 124a. Spring component 118 couples to ferrule cup 404a, providing the forward bias for ferrule 402a. A float area 416 of ferrule cup 404a permits ferrule cup 404a to move in the z-direction within ferrule socket 124a, thereby enabling ferrule 402a to float within ferrules socket 124a providing tolerance space for cladded fiber 128a to bend within the duplex ferrule flange 120. As illustrated in FIG. 4C, cladded fiber 128a has a bend.

Figure 5:
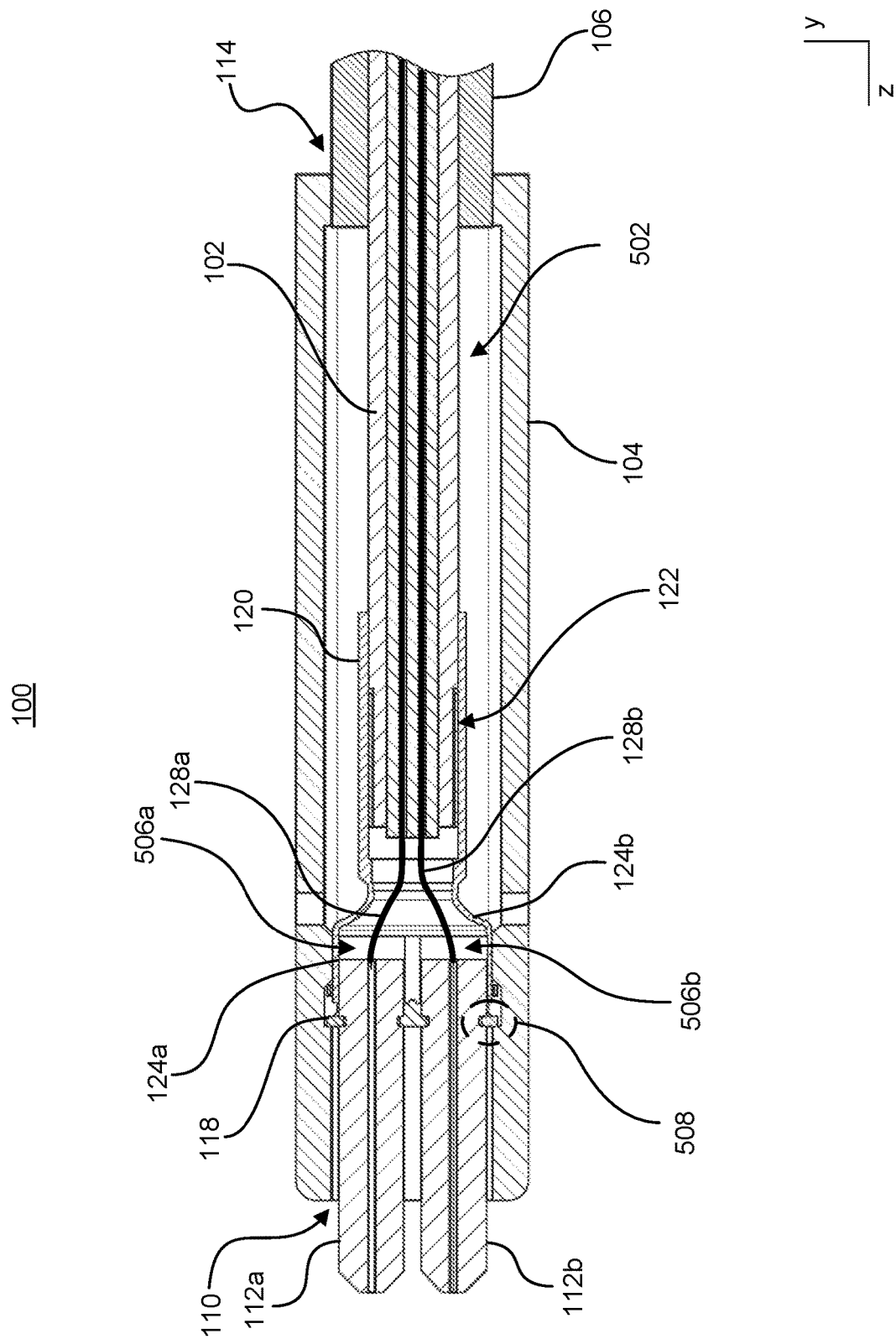
FIG. 5 is a cross-sectional view illustrating the relationship between components of the example compact duplex connector assembly of FIG. 1 in accordance with embodiments of the technology disclosed herein.

FIG. 5 is a cross-sectional view of the example compact duplex connector assembly 100A discussed with respect to FIG. 1, illustrating the internal structure of the example compact duplex connector assembly 100A in accordance with embodiments disclosed herein. FIG. 5 provides an example relationship of the various components of compact duplex connector assembly 100A. Although discussed with respect to the embodiment of FIG. 1, a person of ordinary skill in the art would know that a similar discussion is applicable to other embodiments, such as embodiments using the ferrule connector component 400 discussed with respect to FIGS. 4A, 4B, and 4C above. As illustrated in FIG. 5, optical cable 102, coupled to ferrule connector component 300, is contained within housing 104. For ease of discussion, housing 104 illustrated in FIG. 5 refers to both rear portion 114 and main portion 126 discussed above with respect to FIG. 2A As shown in FIG. 5, optical cable 102 may comprise two cladded fibers 128a, 128b. Cladded fibers 128a, 128b may be configured as a receive channel and a transmit channel for an optical system, each coupled with a respective one of ferrules 112a, 112b. Cladded fibers 128a, 128b may be exposed by stripping an end of optical cable 102.

As discussed above, embodiments in accordance with the present disclosure provide duplex ferrule flange 120, enabling two simplex ferrules (ferrules 112a, 112b) to be supported by a single flange to provide a duplex ferrule connector assembly, as opposed to requiring two separate simplex ferrule assemblies like current duplex connector assemblies. Each cladded fiber 128a, 128b is routed from the stripped end of optical cable 102 within duplex ferrule flange 120 to the respective ferrule 112a, 112b, through a respective ferrule socket 124a 124b. Housing 104 may include one or more cutouts 508 configured to mate with a front face of spring component 118. In various embodiments, cutout 508 may be a channel within the interior surface of housing 104, as illustrated in FIG. 5, and configured such that bars 312a, 312b contact an interior wall of cutout 508 to impede spring component's 118 forward motion (along the z-axis), stopping spring component 118 from providing a forward bias sufficient to pull ferrules 112a, 112b out of their seats in ferrule sockets 124a, 124b. In other embodiments, cutout 508 may be implemented as an extrusion from an interior surface of housing 104. Therefore, with fewer components, embodiments of the technology disclosed herein provides a compact and cost-efficient duplex connector over current solutions.

Each ferrule 112a, 112b is independently-floated (e.g., movable along the z-axis) within each ferrule socket 124a, 124b. Each ferrule socket 124a, 124b is configured such that, when each ferrule 112a, 112b is inserted, there is a tolerance space 506a, 506b. Tolerance space 506a, 506b provides space behind each ferrule 112a, 112b to account for z-direction motion of ferrules 112a, 112b in the direction of duplex ferrule flange 120 caused by, for example, installation of compact duplex connector assembly 100A into a ferrule adapter (not shown). By providing each ferrule 112a, 112b with its own ferrule socket 124a, 124b, each ferrule 112a, 112b can independently float within its respective ferrule socket 124a, 124b. Moreover, by including tolerance space 506a, 506b embodiments in accordance with the present disclosure allow space to account for bending of cladded fibers 128a, 128b within duplex ferrule flange 120 such that, when ferrules 112a, 112b do float in the direction of duplex ferrule flange 120, cladded fibers 128a, 128b are not bent too severely and/or caught between a ferrule (112a and/or 112b) and the wall of a ferrule socket (124a and/or 124b).

By implementing embodiments in accordance with the example compact duplex connectors discussed with respect to FIGS. 1-5, higher-density architectures may be implemented within data centers in a cost-conscience manner. The smaller form-factor, and the single duplex ferrule flange and spring component in one layer of the housing, of embodiments discussed herein allows a higher-density application, wherein a greater number of optical connectors to be included within the same space as with current LC Duplex connectors (or similar solutions). The independently-floated aspect of the embodiments of the present disclosure allows for reliable and high-performance optical coupling by allowing each ferrule within the duplex connector to independently adjust to ensure proper alignment with respect to the mating duplex connector within a ferrule adapter. Moreover, fewer components (due to the need of only a single flange and spring component) reduces the overall size and cost of assembly for the compact duplex connector assembly in accordance with the present disclosure.

In various embodiments, a ferrule adapter for use with compact duplex connectors, like those discussed with respect to FIGS. 1-5, further provides an easier approach to polarity keying. Generally, to change the polarity of optical connectors requires that the connector assembly be disassembled and the simplex ferrule assemblies physically switched. Some current solutions attempt to avoid the need to disassemble the connector by including a securing feature which may be reversed (i.e., the latching feature can be disconnected from one side of the connector and attached to another, thereby flipping the position of the cladded fibers). However, such solutions still address the issue at the connector-side, resulting in changes being made to the connector itself. Moreover, when APC ferrules are used, current solutions require each ferrule to be rotated 180° to allow complementary mating with a respective ferrule within a ferrule adapter. Moreover, when there are many ferrule adapters, it may be difficult for a duplex ferrule housing to be inserted with proper orientation in a respective ferrule adapter without visually identifying the latching hole's orientation on a ferrule adapter. Embodiments of the present disclosure provide a polarity-keyed adapter which may be installed in a panel of a device or instrument rack for use with the compact duplex connector assembly described above. Polarity can be changed simply by connecting the compact duplex connector assembly into an adapter bay with a polarity key plug installed in an UP or DOWN socket. In this way, polarity changes are handled at the adapter-side, rather than requiring any changes to be made at the connector. This makes polarity keying during deployment (i.e., after installation at a data center) easier by eliminating the need to disassemble or otherwise modify the connector coupled to the optical cable. In addition, by physically rotating the entire duplex ferrule housing for two duplex ferrules to be mated within a ferrule adapter, embodiments of the present disclosure automatically align each respective mating simplex ferrules' end-faces to be in complementary orientations within a ferrule adapter, allowing asymmetrically polished ferrule end-faces, e.g., APC, to be mated correctly. Moreover, a duplex ferrule may be easier to be inserted in a ferrule adapter by abutting the flat surface (i.e., without the latch) of ferrule housing to the flat surface of the polarity keying plug that protrudes beyond the ferrule adapter bay.

Figure 6:
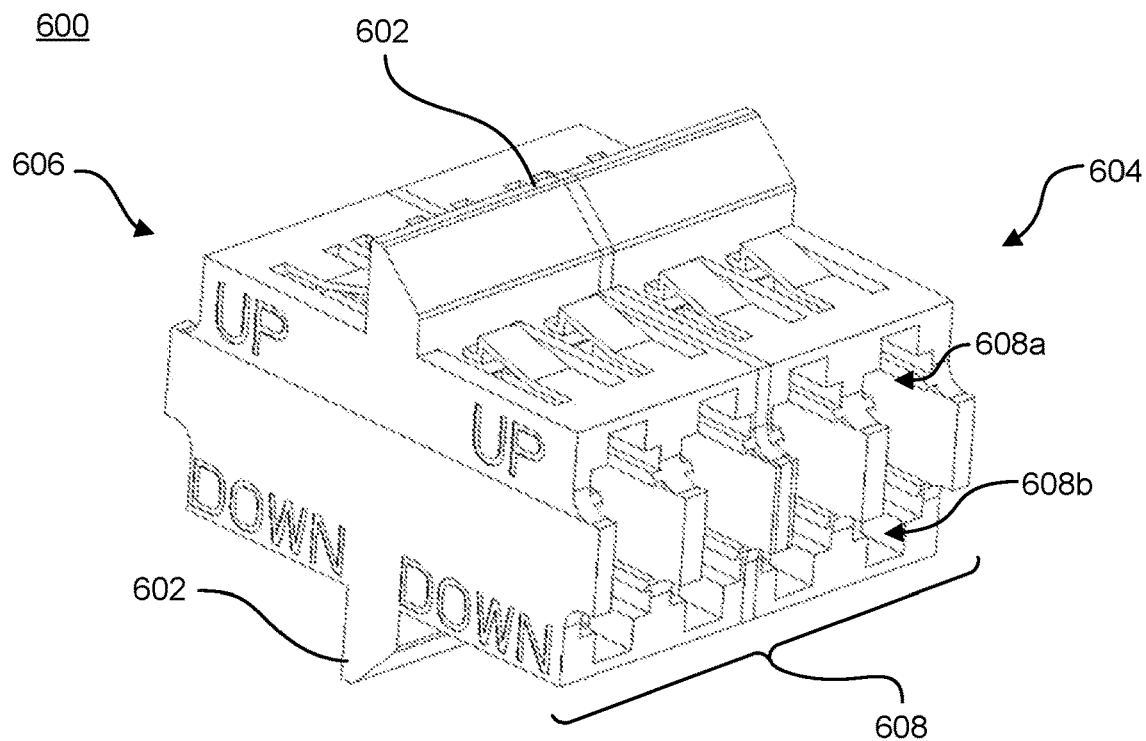
FIG. 6 illustrates an example polarity-keyed adapter in accordance with embodiments of the technology disclosed herein.

FIG. 6 illustrates an example dual-polarity-keyed adapter 600 in accordance with embodiments of the technology disclosed herein. Dual-polarity-keyed adapter 600 shows a 1×4 dual-polarity-keyed adapter (i.e., four duplex optical cables may be connected on each side of the adapter). Although discussed with respect to a 1×4 dual-polarity-keyed adapter 600, this is used for explanation purposes only and should not be interpreted as limiting the subject matter of the present disclosure to only such 1×4 adapters. As would be understood by a person of ordinary skill, and illustrated with respect to FIGS. 7-9 below, various embodiments may include other arrangements. As a non-limiting example, another dual-polarity-keyed adapter may be a 1×2 adapter, connecting two optical cables on each side of the adapter. In other embodiments, dual-polarity-keyed adapter may comprise a number of other configurations, including but not limited to 1×1, 1×6, 1×8, and so on. A person of ordinary skill would understand that the number of connections which may be included in a configuration depends on the implementation and nothing in this disclosure should be interpreted as limiting configurations to an arbitrary number of connections.

As shown in FIG. 6, dual-polarity-keyed adapter 600 has a first side 604 and a second side 606. In various embodiments, dual-polarity-keyed adapter 600 may be included within a panel of a device, instrument rack, patch panel, or other connection bulkhead, with the second side 606 disposed on a backside of the bulkhead and the first side 604 disposed on the frontside of the bulkhead (i.e., accessible during normal operation). A panel mounting feature 602 may be disposed on a top and/or bottom side of dual-polarity-keyed adapter 600. In other embodiments, dual-polarity-keyed adapter 600 may be used independently of any device or bulkhead to connect one set of optical cables to another.

A plurality of dual-polarity ports 608 may be disposed on the first side 604, and a corresponding plurality of dual-polarity ports (not shown) on the second side 606. Each dual-polarity port 608 includes an UP socket associated with a first polarity (e.g., 608a) and a DOWN socket associated with a second polarity (e.g., 608b). Although marked as the UP socket and the DOWN socket in FIG. 6, the sockets need not be marked as such in all embodiments. As a non-limiting example, the socket associated with the first polarity may be identified with the numeral "1," and the socket associated with the second polarity may be identified with the numeral "2." In other embodiments, "+" and "−" may be used to differentiate between the first polarity and the second polarity. A person of ordinary skill in the art would understand that any markings which differentiate between the two polarities is consistent with the subject matter disclosed herein. In various embodiments, the first polarity may be associated with the compact duplex connector assembly being installed in a 0° orientation, while the second polarity may be associated with the compact duplex connector assembly being installed in a 180° orientation. In some embodiments, the orientation associated with each polarity is switched.

Figure 7:
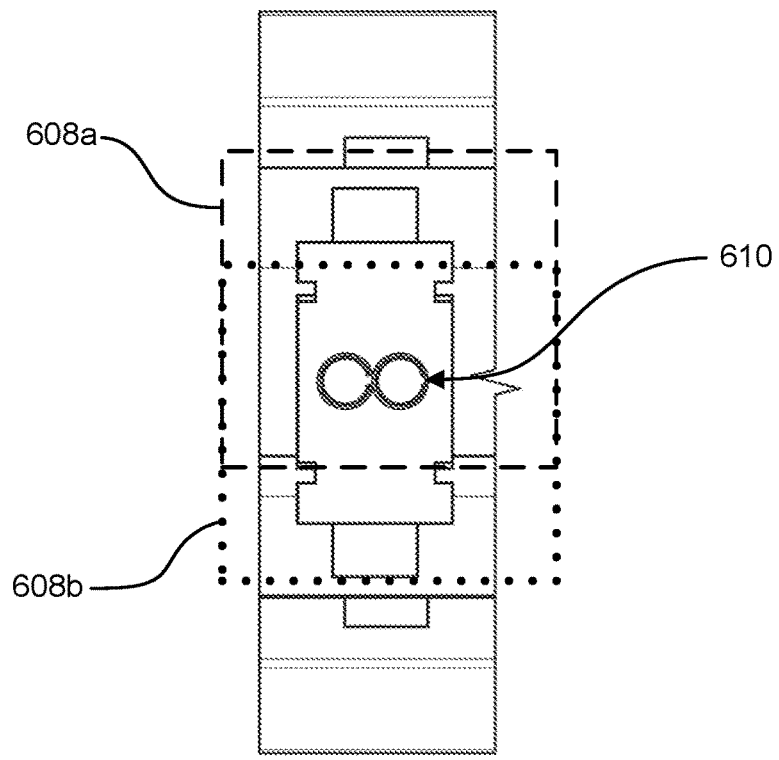
FIG. 7 illustrates an example dual-polarity port of the example polarity-keyed adapter of FIG. 6 in accordance with embodiments of the technology disclosed herein.

FIG. 7 illustrates an example dual-polarity port 608 of FIG. 6. As illustrated in FIG. 7, UP socket 608a and DOWN socket 608b are configured to couple to the compact duplex connector, each having the same shape, UP socket 608a disposed in a first position and DOWN socket 608b disposed at a second position being oriented 180° with respect to UP socket 608a. UP socket 608a and DOWN socket 608b are configured such that they overlap each other so, in either polarity configuration, the ferrules of the compact duplex connector assembly are aligned with ferrule sockets 610. Ferrule sockets 610 enable the ferrules connected to a socket of dual-polarity port 608 to mate with the ferrules connected to a socket of the dual-polarity port disposed on the second side 606 of dual-polarity-keyed adapter 600. In various embodiments, ferrule sockets 610 may comprise a separate socket for each ferrule pair (comprising a ferrule from a first side and a ferrule from a second side).

Figure 8:
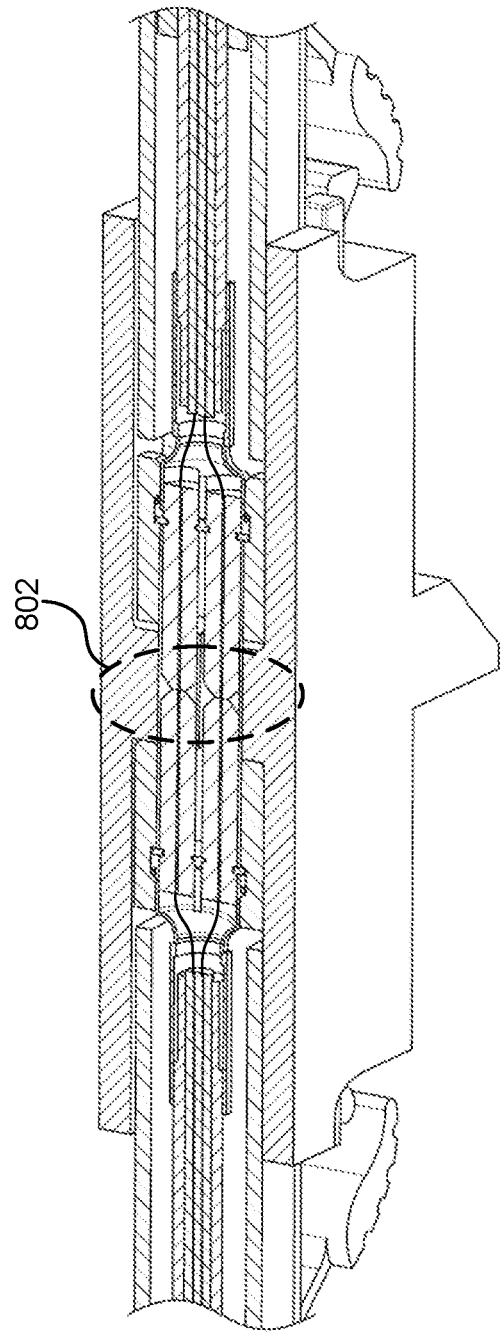
FIG. 8 is a cross-sectional view of two compact duplex connector assemblies connected through a polarity-keyed adapter in accordance with embodiments of the technology disclosed herein.

FIG. 8 is a cross-sectional view of two compact duplex connector assemblies connected through a dual-polarity-keyed adapter 800 in accordance with embodiments of the technology disclosed herein. For illustrative purposes, both compact duplex connector assemblies are connected to UP sockets on the first side and the second side of the dual-polarity-keyed adapter 800, but similar coupling between ferrules on either side of dual-polarity-keyed adapter 800 may occur regardless of the particular socket either or both compact duplex connector assemblies are inserted within. As illustrated, the ferrules of each connector mate through the ferrule sockets 802, the cores of each ferrule aligning with the core of the corresponding ferrule on the opposite side of dual-polarity-keyed adapter 800.

Figure 9:
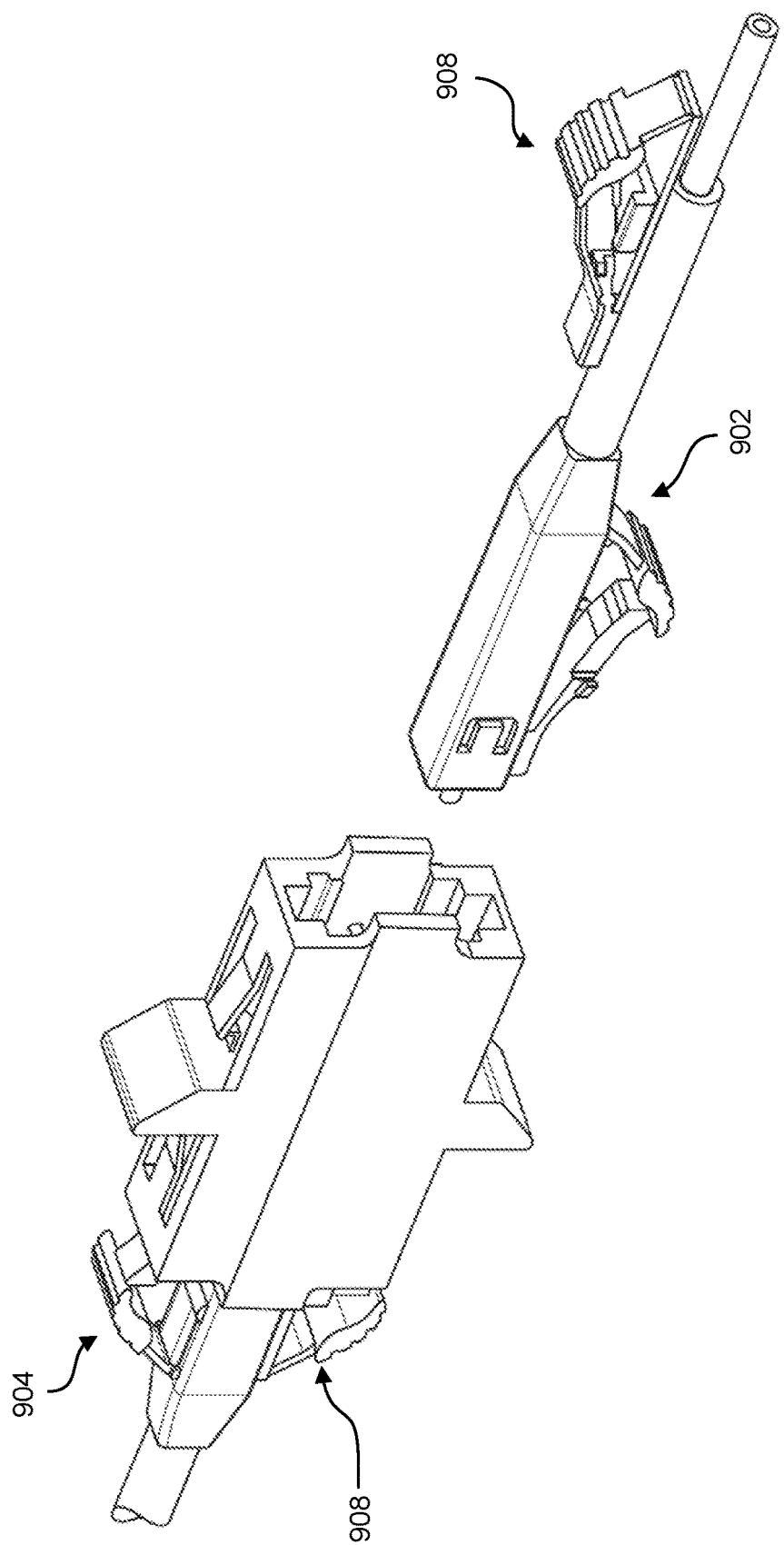
FIG. 9 illustrates an example keying procedure in accordance with embodiments of the technology disclosed herein.

FIG. 9 illustrates an example keying procedure in accordance with embodiments of the present disclosure. As illustrated, a first optical cable 902 and a second optical cable 904 are in the process of being communicatively coupled together through polarity-keyed adapter 906. Second optical cable 904 is already connected to the UP socket of a dual-polarity port on a second side (i.e., backside) of polarity-keyed adapter 906. First optical cable 902 is in the process of being connected to the DOWN socket of the dual-polarity port 910 of polarity-keyed adapter 906. In various embodiments, a polarity keying plug 908 may be installed in the socket of each dual-polarity port which is not being utilized by the connector. For example, as shown a polarity keying plug 908 is installed in the DOWN socket of the dual-polarity port in which second optical cable 904 is connected, whereas another polarity keying plug 908 is in the process of being installed in the UP socket of dual-polarity port 910. Utilizing the polarity keying plugs 908, various embodiments of dual-polarity adapter 906 may enable a variety of different polarity configurations, including key-down/key-down mating (i.e., each optical cable 902, 904 installed in the DOWN socket on the respective side of the adapter 906), key-down/key-up mating (i.e., second optical cable 904 installed in the DOWN socket, and first optical cable 902 installed in the UP socket), key-up/key-up mating, and key-up/key-down mating.

Figure 10:
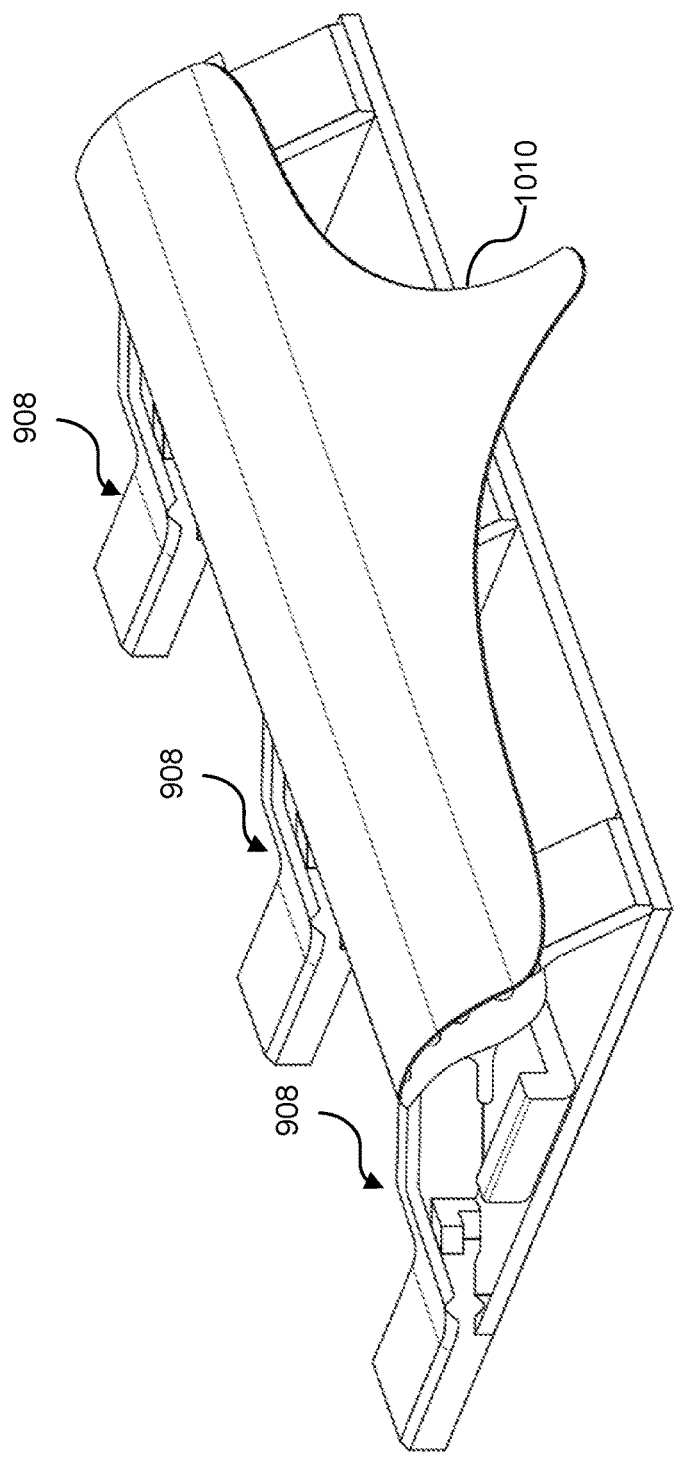
FIG. 10 illustrates an example grouped plurality keying plug in accordance with embodiments of the technology disclosed herein.

In some embodiments, a plurality of polarity keying plugs 908 may be combined into a grouped polarity keying plug, as illustrated in FIG. 10. As illustrated, grouped polarity keying plug 1000 comprises three polarity keying plugs 908, combined together as a single component. Where multiple optical cables are being installed in the same orientation (i.e., each cable in a row is being inserted in the DOWN socket of multiple dual-polarity ports), grouped polarity keying plug 1000 can result in a polarity keying plug 908 being inserted into the unused socket of the adapter, similar to the use of polarity keying plug 908 of FIG. 9. Although illustrated with only three polarity keying plugs 908 grouped together in grouped polarity keying plug 1000, this is presented for illustrative purposes only and should not be interpreted as limiting the scope of the present disclosure to only such embodiments. A person of ordinary skill in the art would understand that any number of plugs may be included in grouped polarity keying plug 1000. In various embodiments, a release feature 1010 may be included that enables an engineer or installer to release each of the plugs of grouped polarity keying plug 1000 in unison, without the need to release individual latching features of each plug.

Use of polarity-keying plug 908 provides an additional advantage over current cabling approaches. Specifically, polarity-keying plug 108 may be used to assist in guiding the cable connector into dual-priority port 910. A common issue with connecting cables in a dense area is that identifying which direction the latching hole is oriented requires line of sight. However, in high-density environments, the number of cables makes it difficult to see the adapter. Embodiments of the present disclosure make cable installation easier by reducing the need to identify the exact orientation of the latching hole of the adapter. Instead, installation merely requires positioning the connector in the intended orientation and inserting both the connector and the polarity-keying plug 908 into the adapter at the same time. Accordingly, cable installation can be greatly improved.

In common usage, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusively" and "A and B, but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A duplex ferrule component, comprising:
   a duplex ferrule flange having a first end and a second end, the first end configured to receive an optical cable and the second end comprising two ferrule sockets;
   a spring component comprising two ferrule couplers; and
   two ferrules, each ferrule having a retention feature configured to mate with one of the two ferrule couplers;
   wherein each ferrule is independently-floated within one of the two ferrule sockets of the duplex ferrule flange such that each ferrule can move in a z-direction independently of the other ferrule;
   wherein the retention feature of each ferrule comprises a ferrule cup, wherein each ferrule is configured to seat within a cavity of the ferrule cup,
   wherein each ferrule cup comprises a groove configured to mate with one of the ferrule couplers of the spring component and a fiber aperture disposed on a bottom of the ferrule cup configured for an cladded fiber of the optical cable to be inserted.

2. The duplex ferrule component of claim 1, wherein the retention feature of each ferrule comprises a groove configured to mate with one of the ferrule couplers of the spring component.

3. The duplex ferrule component of claim 1, further comprising a crimp collar component disposed on an end of the optical cable inserted within the first end of the duplex ferrule flange.

4. The duplex ferrule component of claim 1, the spring component comprising a sheet metal spring.

5. The duplex ferrule component of claim 1, the spring component further comprising a top bar coupled to a top of each ferrule coupler and a bottom bar coupled to a bottom of each ferrule coupler.

6. The duplex ferrule component of claim 1, wherein each ferrule coupler comprises a ferrule slot configured to mate with the retention feature of one of the ferrules.

7. The duplex ferrule component of claim 1, wherein each ferrule comprises an angled physical contact (APC) ferrule, and wherein an interior surface of each ferrule socket comprises a pattern to secure each ferrule in an angular orientation during rotation.

8. A compact duplex ferrule connector, comprising:
   a housing having a rear portion and a main portion;
   an optical cable inserted into a cavity of the main portion through the rear portion; and
   a duplex ferrule component coupled to an end of the optical cable within the cavity of the housing, comprising:
     a duplex ferrule flange having a first end and a second end, the first end configured to receive the end of the optical cable and the second end comprising two ferrule sleeves;
     a spring component comprising two ferrule couplers; and
     two ferrules, each ferrule having a retention feature configured to mate with a one of the two ferrule couplers;
     wherein each ferrule is independently-floated within one of the two ferrule sockets of the duplex ferrule flange such that each ferrule can move in a z-direction independently of the other ferrule;
   wherein the two ferrules are configured to extend out of a front opening of the housing to mate with an optical port;
   wherein the retention feature of each ferrule comprises a ferrule cup, wherein each ferrule is configured to seat within a cavity of the ferrule cup,
   wherein each ferrule cup comprises a groove configured to mate with one of the ferrule couplers of the spring component and a fiber aperture disposed on a bottom of the ferrule cup configured for an cladded fiber of the optical cable to be inserted.

9. The compact duplex ferrule connector of claim 8, wherein the retention feature of each ferrule comprises a groove configured to mate with one of the ferrule couplers of the spring component.

10. The compact duplex ferrule connector of claim 8, wherein each ferrule cup is configured to maintain an angular orientation of the ferrule.

11. The compact duplex ferrule connector of claim 8, the duplex ferrule component further comprising a crimp collar component disposed on an end of the optical cable inserted within the first end of the duplex ferrule flange.

12. The compact duplex ferrule connector of claim 8, wherein each ferrule coupler comprises a ferrule slot configured to mate with the retention feature of one of the ferrules.

13. The compact duplex ferrule connector of claim 8, wherein the housing further comprises one or more cutouts on an interior surface of the cavity of the housing, each cutout configured to contact the spring component to stop a forward bias of the spring component.

* * * * *